United States Patent [19]
Holroyd et al.

[11] Patent Number: 4,746,956
[45] Date of Patent: May 24, 1988

[54] MICROFILM PRINTER APPARATUS AND METHOD

[75] Inventors: Bruce A. Holroyd, Fairport; Eugene W. Lachut, Rochester, both of N.Y.

[73] Assignee: Eastman Kodak Company, Rochester, N.Y.

[21] Appl. No.: 947,456

[22] Filed: Dec. 29, 1986

[51] Int. Cl.⁴ .................. G03B 27/52; G03B 27/46
[52] U.S. Cl. .................................... 355/41; 355/45; 355/54; 353/26 A
[58] Field of Search ............... 355/43, 45, 54, 46, 355/41; 353/26 A

[56] References Cited

U.S. PATENT DOCUMENTS

| | | | |
|---|---|---|---|
| 3,400,631 | 9/1968 | Rauscher | 355/45 |
| 3,734,610 | 5/1973 | O'Connell et al. | 355/40 |
| 3,740,136 | 6/1973 | Maloney et al. | 355/43 |
| 3,759,611 | 9/1973 | O'Connell et al. | 355/43 |
| 3,898,003 | 8/1975 | Aronson et al. | 355/43 |
| 4,134,674 | 1/1979 | Ohsaki et al. | 355/43 |
| 4,324,484 | 4/1982 | Johnson | 355/45 X |
| 4,616,126 | 10/1986 | Yanagawa et al. | 353/26 A X |

OTHER PUBLICATIONS

Operator's Manual Kodak IMT-350 Microimage Terminal, Nov. 1985.

Primary Examiner—Michael L. Gellner
Assistant Examiner—D. Rutledge
Attorney, Agent, or Firm—Norman Rushefsky

[57] ABSTRACT

A microfilm strip includes image frames arranged in chapters with indicia provided identifying those image frames which head the chapters. When it is desired to produce multiple prints of each of the image frames in a chapter the image frame comprising the first frame or head of the chapter is moved into the print gate. Upon entry of the print command signal, the strip is automatically advanced so that the last frame of the chapter is in the print gate. The printer then automatically prints each frame of the chapter starting with the last frame and ending with the first frame of the chapter. The prints arrive face-up at the output of the printer in collated form. As multiple sets of prints of the chapter are desired, the microfilm after printing the first image frame, returns to the last image frame for repeat printing of another set of prints of the chapter. This operation is repeated until the number of sets of collated prints is provided at the output. Provision is also made for automatically printing of collated sets of portions of a chapter.

7 Claims, 7 Drawing Sheets

MICROFILM PRINTER APPARATUS AND METHOD

BACKGROUND OF THE INVENTION

1. Field of the Invention

This invention relates to an apparatus and method for making enlargements or prints of images stored on microfilm.

2. Description of the Prior Art

The practice of using microfilm reader-printer apparatus comprising the combination of a copying system and a reader is quite popular. Often it is desirable to print out several related documents stored on adjacent image frames. It is known, for example, on the KODAK IMT-350 Microimage Terminal to distinguish between groups of related documents stored as image frames to facilitate automatic reproduction of a related group of documents. To this end, each related group or batch hereinafter called "chapter" has the first page or image frame of the chapter (chapter head page) distinguished from the other pages of that chapter by a special indicium placed adjacent the image frame. Each other image frame of the chapter has an indicium associated therewith that is different from the chapter head page. These indicia allow for automatic reproduction of pages from a chapter. Thus, with the chapter head image frame in the print gate and a print command signal provided to produce multiple prints of the frames in this chapter, the printer will print multiple copies of the chapter head image and multiple copies of each of the succeeding image frames in the chapter. The operator would then need to take the stack of prints and manually collate them before sending a print set to each of the persons desiring one.

The above prior art apparatus is operable in another mode to print multiple sets of copies from only a portion of the chapter. In this mode the last image frame of the portion of the chapter to be reproduced is placed in the print gate. Upon initiation of a print command signal designating the number of print sets, the correct number of prints of each image frame is made starting with the one in the print gate and succeeding in turn until the correct number of prints of the chapter head image frame is made. Again, these prints need to be collated manually before sending a print set to each of the persons desiring one.

In U.S. Pat. No. 3,898,003 a viewer-printer apparatus is disclosed for producing prints from microfilm arranged as microfiche. In this apparatus, production of multiple sets of collated prints is made by first determining how many image frames are desired to be produced. This first step is accomplished by manually stepping through each image frame as noted on the viewer and counting the number of successive image frames of interest. Thereafter, the location of the first image frame to be printed needs to be input into the apparatus by the operator. Also, where prints are to issue from the machine face-up (a desirable convenience to the operator) care must be provided to mount the microfiche in a particular orientation to facilitate advancement of the image frames from the last frame to be reproduced towards the first frame of the print set.

The apparatus of U.S. Pat. No. 3,898,003 presents a substantial inconvenience to the production of collated prints of image frames stored on microfilm.

It is, therefore, an object of the invention to provide method and apparatus for producing collated prints of image frames stored on a microfilm that is a substantial improvement to that of the prior art.

SUMMARY OF THE INVENTION

The above and other objects are achieved in an apparatus and method for producing prints from a microfilm wherein signals are stored corresponding to a selectable first variable number of prints to be made of each of a second variable number of image frames on a microfilm and, in response to a print signal, there is automatically produced collated sets of said number of prints of each of said number of image frames. The apparatus and method of the invention are characterized in that means are provided for automatically distinguishing between chapters of image frames on said microfilm and, in response to said print signal, printing only the selected number of prints of a variable number of image frames in a chapter.

BRIEF DESCRIPTION OF THE DRAWINGS

FIGS. 6I and 6II comprise a flow chart of a computer program for modifying the apparatus of the prior art to produce collated sets of prints in accordance with the invention.

DETAILED DESCRIPTION OF THE PREFERRED EMBODIMENTS

Because reader-printer microfilm apparatus are well known, the present description will be directed in particular to elements forming part of or cooperating more directly with the present invention. Elements of reader-printer apparatus not specifically shown or described herein are selectable from those known in the prior art.

Figure 1:
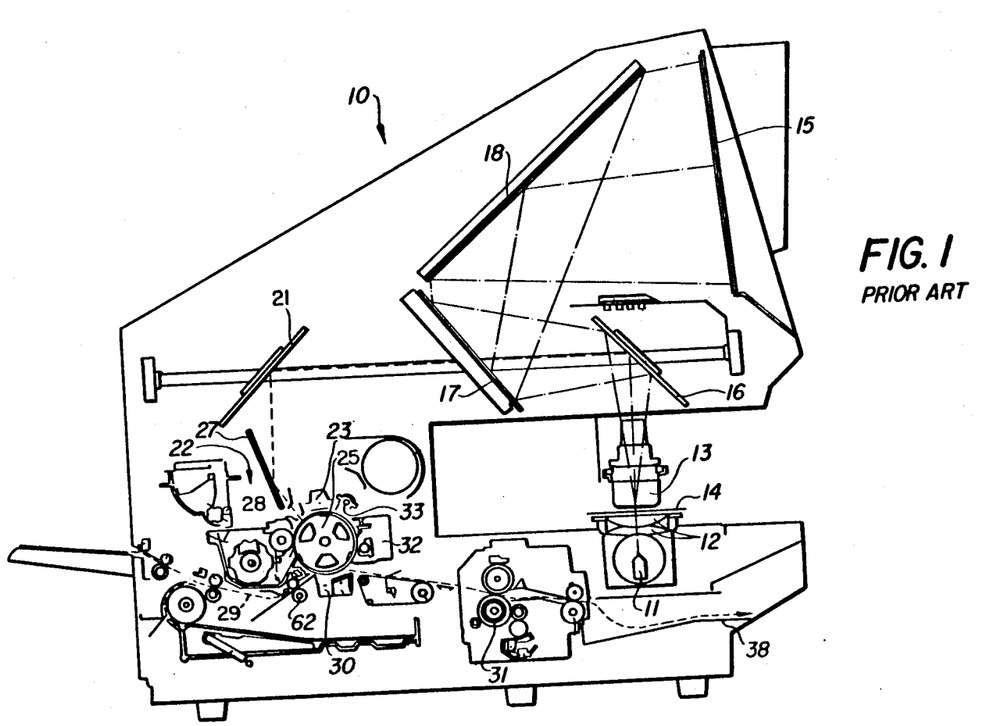
FIG. 1 is a diagrammatic side elevational view showing the functional components of a prior art reader-printer apparatus.

With reference now to FIG. 1, a prior art reader-printer apparatus 10 is shown. The apparatus includes a projection lamp 11, condenser lens assembly 12 and a projection lens 13 for projecting an enlarged image of an image frame on microfilm strip 14 onto a projection screen 15 via mirrors 16, 17 and 18.

Figure 2:
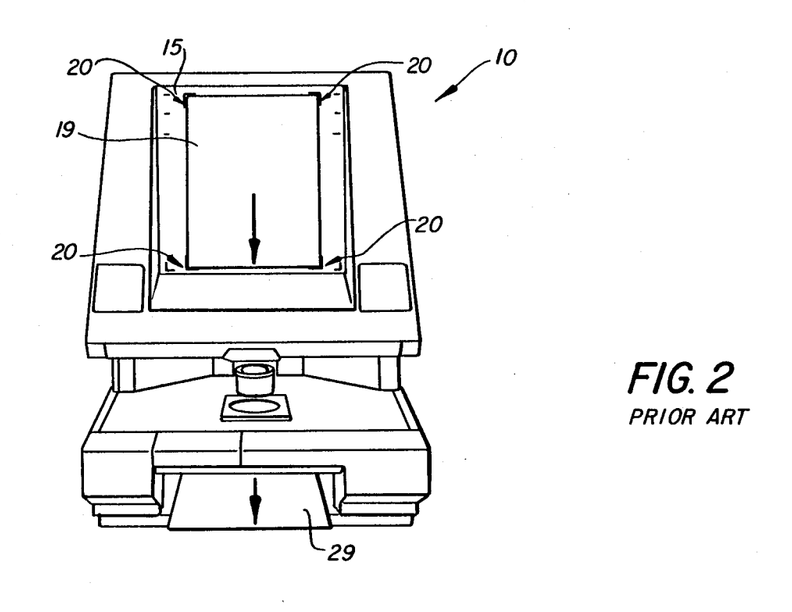
FIG. 2 is a diagrammatic front elevational view of the prior art reader-printer apparatus of FIG. 1.

With reference now also to FIG. 2, during the viewing or reading mode the image 19 of say a document page stored on the microfilm as an image frame is located on the screen by suitable conventional means so that an edge of an image of the document page is in alignment with image positioning marks 20. While description will hereafter be made with reference to the microfilm images appearing as document pages, it should be appreciated that the image may not be of pages but could be of checks or other types of documents. The term "image frame" will be used to broadly describe individual image segments appearing on the microfilm. To produce one or more prints of an individual image frame, a print button is depressed to change the mode of the reader-printer apparatus from the reading mode to a printing mode. In the printing mode, means are provided for pivoting mirror 17 from the position shown in FIG. 1 so that it is no longer in blocking relationship to mirror 21. This latter mirror cooperates with mirror 16 to form a scanning mirror pair for imaging an enlarged image 19 of a document page onto a photoconductive drum 25 that is part of an electrophotographic printing engine 22. While description herein will be made with regard to prints formed by an electrophotographic apparatus, other types of reproduction of prints from microfilm may be used.

As known in the prior art, the engine is adapted to be operated in two modes. In the N-P mode, an image of a document that is stored on a microfilm as a negative image is reproduced as a positive image print on a copy sheet. This is accomplished by having a corona charger 23 be electrically coupled to a highly negative electrical power supply to form a corona discharge of negative ions that flow towards the surface of drum 25 as it is rotated. A grid electrode may be electrically biased by a grid power supply to control the voltage level of charge deposited on the drum. During the exposure process, the image 19 of the document page is scanned in increments upon the rotating drum via mirrors 16, 21 and 27 to form a latent electrostatic image of the document page. The latent image is developed as the drum rotates past a development station 28 wherein negatively charged electroscopic toner is selectively attracted to areas of the drum which have been exposed to imaging radiation passing through the microfilm image of the document page to form a visible image. The developed image on the drum is then transferred to a copy sheet 29 of say plain paper by advancing the copy sheet so that a leading edge thereof is moved into engagement with the drum in synchronism with the edge of the developed image of the document page. The copy sheets may be stored as discrete sheets of standard size in a cassette located below the drum 25. As segments of the copy sheet are continuously moved into engagement with the drum, an image transfer corona charger 30 applies a positive charge to the backside of the sheet. As each sheet segment leaves contact with the drum the negatively charged toner remains attracted to the sheet and the image is thus transferred to the sheet. The sheet is then passed between a pair of fusing rollers 31 to fix the toner to the sheet. The drum is then rotated past a cleaning station 32 wherein residual toner not transferred to the sheet is removed. An erase lamp 33 is illuminated to erase charge from the drum prior to forming the next copy.

In the P-P mode, an image of the document page that is stored on a microfilm as a positive image is reproduced as a positive image on a copy sheet. In this mode corona charger 23 is coupled to a positive electrical power supply and deposits a positive charge on the drum whose potential level is controlled by a grid electrode coupled to a suitable power supply. As the drum rotates it is exposed to the image of the document page and an electrostatic latent image is formed on the surface. The latent image is developed with the negatively charged electroscopic toner and transferred and fixed to a copy sheet as described above.

Figure 3:
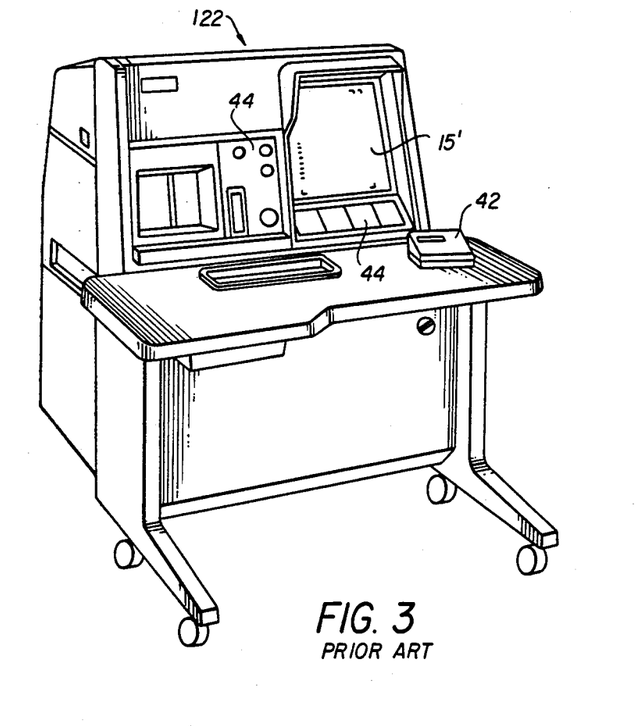
FIG. 3 is a perspective view of another prior art reader-printer apparatus.
Figure 5:
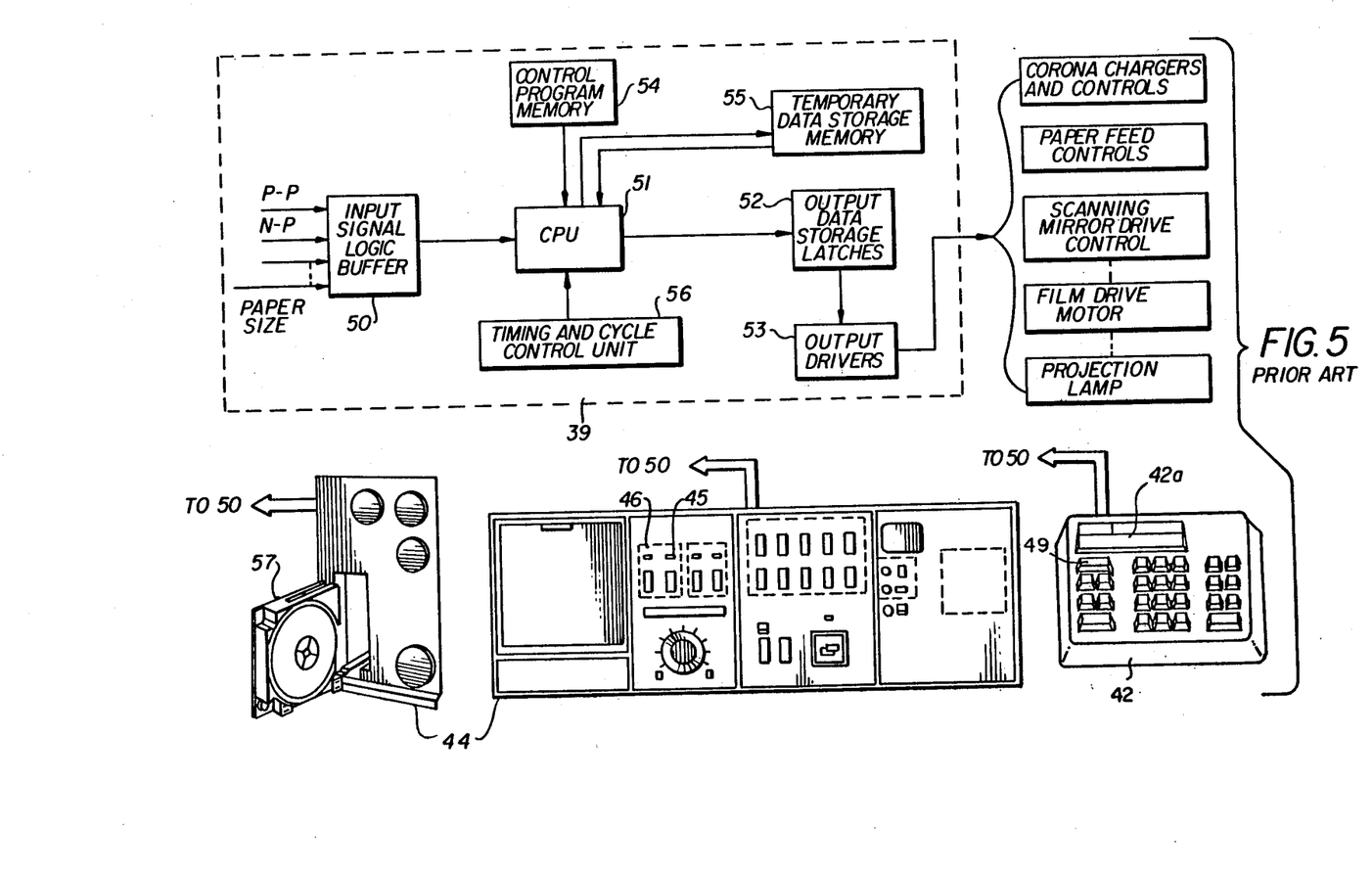
FIG. 5 is a schematic of a prior art control panel and circuit for controlling a reader-printer apparatus such as that described herein.

With reference now to FIG. 3, there is shown another prior art microfilm reader-printer apparatus 122 known as the Kodak IMT-350 Microimage Terminal. This apparatus provides prints from microfilm in a manner similar to that described for the apparatus of FIGS. 1 and 2. With reference now to FIG. 5, a control panel 44 is shown forming a part of the prior art apparatus 22 and which includes P-P and N-P mode buttons 45, 46 and various other control buttons to control exposure, etc. A slot is provided in the control panel for receiving a magazine 57 having a supply of microimages formed on a strip of microfilm. The apparatus includes controls for automatically threading the strip into a film drive when the magazine is inserted into the slot. A keyboard 42 is also provided and includes various control buttons and alphanumeric display 42a. Inputs from the various control buttons are applied through input signal logic buffer 50 of the reader-printer's logic and control unit (LCU) 39. The input signals to signal buffer 50 consist of logic level digital signals which may be stored in a temporary data storage memory 55 in the microprocessor based LCU. Output data for controlling the apparatus are provided by the LCU with output data storage latches 52 and output drivers 53. The drivers in turn directly control operation of the apparatus' components such as motor(s), clutches, solenoids, power switches lamps, chargers and various displays. The LCU's processing functions can be programmed by changing instructions stored in the computer's control program memory 54. The LCU also includes a central processing unit 51 and timing and cycle control unit means 56.

Figure 4:
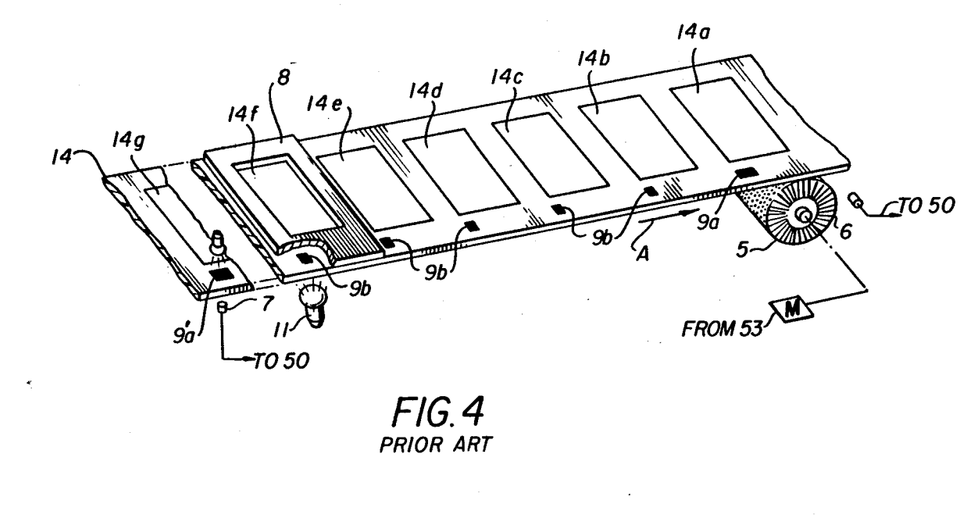
FIG. 4 is a schematic of a microfilm strip known in the prior art to include chapter identifying indicia and a known sensor used in the prior reader-printer apparatus to detect this indicia.

With reference now to FIG. 4, it may be noted that each of the image frames 14a-14g of microfilm strip 14 has adjacent thereto an indicium (9a, 9b), such as a black mark, located near one edge of the frame. It will be noted that image frames 14a and 14g each have indicium (9a, 9'a) that is larger than the other frames shown. These larger indicia designate these frames as chapter heads of their respective chapter of image document pages. Within the group of pages 14a-14f are a related set of documents that have been designated as such during the production of the microfilm. In the most apparant case, the microfilm may be used to store images of a book that is divided into chapters. Indeed, the image frame reproducing the first page of the first chapter of the book may have an indicium even larger to denote that that image frame constitutes both a head of book and head of chapter image frame. In any event, the image frames 14a-14f constitute a chapter of image frames that is distinct from other chapters and for which it is likely that prints will be at times desired for all in the chapter or at least for several in the chapter due to their commonality of subject matter, etc. Image frame 14g and several succeeding image frames therefrom (not shown) in the ascending direction of the microfilm; i.e., in a direction opposite that indicated by arrow A, represents a different chapter of image frames.

As is conventional in apparatus of this type, a motor M is provided to rotate a drive roller 5 to advance a desired image frame into a print gate 8 wherein it is positioned for viewing on the screen 15 or for printing as described above. As noted above, the microfilm is preferably stored within a conventional magazine having an appropriate supply spool. A take-up sppol may be provided as part of the apparatus and the film is payed out from supply to take-up by advancing the film in the direction of the arrow A. The motor M is operated by the LCU and precise location of the image frame in the film gate is accomplished by the use of the indicia sensor 7, which may be a photoelectric device, that is adapted to provide a pulse to the LCU for each indicium sensed. In the prior art apparatus referred to this sensor will be located several image frames upstream of the print gate 8. An encoder 6 is incorporated in one of the drive rollers for providing pulses to the LCU for each small increment of advancement of the film strip. Since a chapter indicium 9a is larger than that of other pages of indicia, the duration of a pulse for which the chapter indicia is sensed by the photosensor is larger and denotes to the LCU that a chapter head page image frame is on the film. Also, it will be understood that as the microfilm strip is advanced, information has been provided to the LCU and is stored in table form in the temporary memory 55 as to the type of image frames that are present between the sensor 7 and the print gate and distances between adjacent image frames. These signals are provided by the signals from encoder 6 and indicia sensor 7 and are used by the LCU to calculate when image frame 14a is precisely located in the print gate 8.

Figures 1, 6:
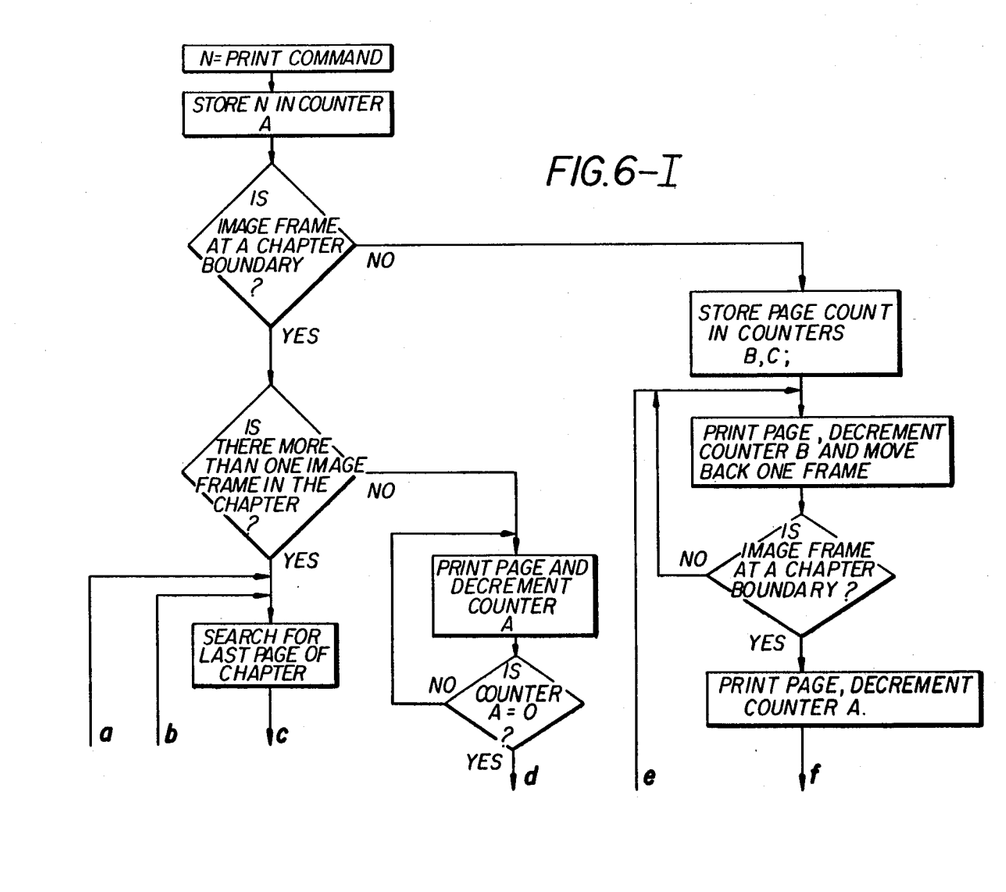
Figures 2, 6:
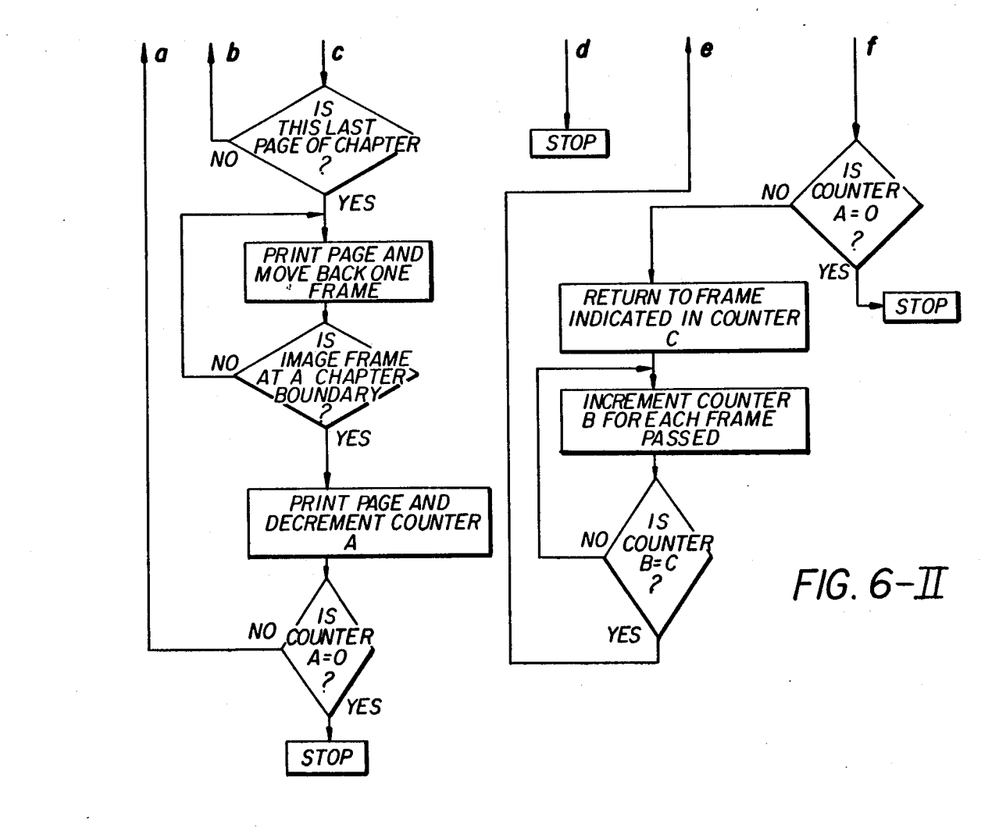

With reference now to FIG. 6, assume that the operator, either manually or through a conventional computer-aided-retrieval device, has located in the print gate a chapter head image frame of a chapter for which multiple sets of collated copies are desired. After inputting exposure information including whether the N-P or P-P mode is needed by pressing the appropriate buttons including buttons 45, 46, the operator inputs a variable selectable number (N) comprising the number of copies of the chapter pages that are desired. This is input using keyboard 42. The number N may be any number from one to 99 and such number will be displayed in display 42a associated with this keyboard. Next, the operator presses the * button which is one of the buttons on the keyboard 42 and which is used to designate the multiple copy mode program stored in control program 54. It will be appreciated that other conventional input controls are associated with keyboard 42 such as for allowing the operator to advance the microfilm to the desired image frame by designating the location of the frame number and having the drive to the microfilm automatically search for that frame through counting of the indicia at the edge of each frame. Other controls are associated with control panel 44 for allowing the operator to manually search for this frame using the reader's viewing screen. Upon actuation of the Print Command button 49 the number of copies input, N, is stored in a counter associated with temporary memory 55. If it is determined by signals stored in temporary memory 55 that the image frame 14a in the print gate is a chapter head or chapter boundary the LCU 39 actuates the film drive motor M through signals from the CPU 51, output data storage latches 52 and output drivers 53. The motor M moves the microfilm strip in the direction of arrow A until the last frame, 14f, in the very same chapter is located in the print gate. This last image frame is determined since the next image frame adjacent it in the direction of arrow A is a chapter head or chapter boundary frame for the next chapter. The location of this last image frame 14f was sensed by sensor 7 and its location stored in temporary memory 55 when the microfilm strip was advanced to place frame 14a in the print gate if this is a short chapter. If this chapter is relatively long with respect to the distance between sensor 7 and the print gate, this image frame 14f would be sensed by sensor 7 as the microfilm is advanced to place frame 14f in the print gate and its location stored in temporary memory 55.

In searching for the last image frame of the chapter the LCU first searches the temporary memory 55 to determine if the last image frame of the chapter has passed the sensor 7. If it has it is a short chapter and the information in this memory is used to locate the image frame 14f in the print gate. If the last frame of the chapter has not passed the image sensor the microfilm strip is advanced as indicated above for relatively long chapters. The LCU is provided in temporary memory 55 with a counter register that stores the location of frame 14f relative to chapter head frame 14a. This register is decremented or incremented each time the strip moves one image frame. When this counter register reaches zero, the chapter head 14a is in the print gate and when it reaches the number originally stored in the register, the last page of the chapter image frame 14f, is in the print gate.

With the image frame 14f now moved into the print gate this frame is printed in accordance with the operation described above and the print or copy sheet 29 delivered face-up to an output tray 38. Of course, conventional means may be provided for permitting for exposure adjustments during setup of this print job. The LCU now operates the motor M to advance the microfilm strip one image frame to print image frame 14d and this step is repeated until the chapter head image frame 14a is printed. This provides one collated set of prints of the chapter, as the prints are in the order of chapter head page first with the last page last and the other pages in their relative order in the stack. A second set of collated prints is made by repeating the above steps. The LCU in response to the completion of printing of the chapter head 14a signals motor M to automatically advance the microfilm strip to place the last frame 14f in the print gate and to commence the second set. Subsequent sets of prints are made until the number of sets counter A is decremented from N to zero at which time the printer stops and the chapter head image frame is located in the print gate and viewable on reader screen 15'. The current state of counter N may be displayed in display 42a.

If the image frame in the print gate at the time the Print Command signal is provided is not a chapter head, the following operation occurs. The location of the image frame now in the print gate relative to the chapter head is stored in counters B and C of temporary memory 55. Again, this location is determined by signals provided by sensor 7 when the microfilm strip was advanced to place this image frame in the print gate. Assume for this example that image frame 14c is in the print gate initially. The number two which implies two image frames from the chapter head 14a is the location of this image frame and this number is stored in counters B and C. The number of collated sets N to be produced is input just prior to pressing of the * button and is stored in counter A which keeps track of the number of prints sets remaining to be made. In this mode, collated sets of prints of only image frames 14a through 14c, inclusive, will be made. In response to the Print Command signal, image frame 14c is printed and motor M advances the strip one image frame to print image frame 14b and then print 14a. The three prints are delivered face-up to the output tray of the printer in the order printed so that they comprise one collated set of prints of the portion of the chapter desired to be printed. Each time the strip moves one image frame towards the chapter head the counter B is decremented by one until it reaches zero at the chapter head image frame 14a. After image frame 14a is printed, and assuming the current state of counter A is not zero, the motor M is actuated by the LCU to advance the image frame 14c into the print gate. The location of image frame 14c is known since it is stored in counter C and counter B is incremented one count for each image frame passed in the direction of arrow A. The operation then repeats for production of the next collated set of prints. For each collated set of prints produced, the counter A is decremented one until it is zero and N collated sets of prints have been made.

Thus, there has been provided a microfilm printer apparatus and method that automatically produces a selected variable number of collated sets of prints of a variable number of image frames stored on a microfilm and that is characterized by the ability to automatically distinguish between chapters of image frames on the microfilm and in response to a print signal print only the selected variable number of prints of a variable number of image frames in a chapter. It will be understood that as used herein the term "variable number of image frames in a chapter" may be either all the image frames in a chapter or some plurality of image frames in the chapter but less than all of them.

The invention has been described in detail with particular reference to preferred embodiments thereof, but it will be understood that variations and modifications can be affected within the spirit and scope of the invention.

We claim:

1. In a microfilm printer apparatus that includes means for storing signals corresponding to a selectable first variable number of prints to be made of each of a second variable number of image frames on a microfilm; means, in response to a print signal, for automatically producing collated sets of said number of prints of each of said number of image frames; and characterized by
   means for automatically distinguishing between chapters of image frames on said microfilm and, in response to said print signal, printing only the selected number of prints of a variable number of image frames in a chapter.

2. The printer of claim 1 characterized by a print gate; means, in response to the print signal, for determining whether an image frame in the print gate is an image frame at the head of a chapter or an image frame that is not at the head of a chapter and in response to such determination producing, if the former, collated sets of prints of all image frames in the chapter and, if the latter, collated sets of prints of those image frames between the image frame in the gate and the image frame at the head of the chapter.

3. In a method of producing prints from a microfilm including the steps of selecting the number of prints of each image frame on the microfilm that are to be produced; determining the number of image frames for which prints are to be produced;
   automatically producing, in response to a print signal, collated sets of said number of prints of each of said image frames; characterized by
   automatically distinguishing between chapters of image frames on said microfilm and, in response to said print signal, printing only the selected number of prints of a variable number of image frames in a chapter.

4. The method of claim 3 characterized in that, in response to said print signal, the microfilm advances from a position wherein an image frame that is at the head of a chapter is in the print gate to a position wherein an image frame that is at the end of that chapter is positioned in the print gate, before making of any prints, and wherein each set of prints are made in the order of last image frame in the chapter to first page of the chapter.

5. The method of claim 4 characterized in that the image frames denoted as heading a chapter each have associated therewith an indicium to distinguish it from other image frames of the chapters and these indicium are sensed by a sensor.

6. The method of claim 3 characterized in that, in respone to said print signal, the microfilm advances from a position wherein a first image frame that is not at the head of a chapter is in the print gate toward an image frame that is at the head of that chapter and produces a print of each image frame in the chapter between said first image frame and said image frame that is at the head of the chapter.

7. The method of claim 6 characterized in that the image frames denoted as heading a chapter each have associated therewith an indicium to distinguish it from other image frames of the chapters and these indicium are sensed by a sensor.

* * * * *